United States Patent [19]

Spada et al.

[11] Patent Number: 4,615,477
[45] Date of Patent: Oct. 7, 1986

[54] METHOD FOR REPLACING TUBES IN A HEADER OR DRUM

[75] Inventors: Ralph E. Spada, Canal Fulton; Thomas Shilot, Bidwell, both of Ohio

[73] Assignee: The Babcock & Wilcox Company, New Orleans, La.

[21] Appl. No.: 604,281

[22] Filed: Apr. 27, 1984

[51] Int. Cl.[4] ............................................. B23K 31/00
[52] U.S. Cl. ................................... 228/119; 228/183; 29/402.08; 29/402.13
[58] Field of Search ............... 228/119, 160, 165, 168, 228/169, 183; 29/402.08, 402.13

[56] References Cited

U.S. PATENT DOCUMENTS

| | | | |
|---|---|---|---|
| 2,429,888 | 10/1947 | Moore | 29/402.08 |
| 3,195,229 | 7/1965 | Culver | 228/169 |
| 3,341,930 | 9/1967 | Belanger | 29/402.08 |
| 3,651,558 | 3/1972 | Chase | 29/402.13 |
| 3,807,024 | 4/1974 | Harvey et al. | 29/402.13 |
| 3,823,464 | 7/1974 | Chartet | 228/165 |
| 3,962,767 | 6/1976 | Byerley et al. | 228/119 |
| 4,235,259 | 11/1980 | Hudock | 29/402.08 |

*Primary Examiner*—Nicholas P. Godici
*Assistant Examiner*—Kurt Rowan
*Attorney, Agent, or Firm*—Robert J. Edwards; Kenneth W. Iles

[57] ABSTRACT

A method for replacing tubes in a drum or header without removing the whole tube entirely is disclosed. According to the method, the old tube is cut off level with the header-member; a recess coterminous with the diameter of the tube is machined into the header creating a seat for a new tube; the recessed old tube end is beveled and the old tube is welded into the header-member along the bevel; and a new tube is inserted into the seat and welded to the exterior of the header-member. In a preferred embodiment, a countersink is machined in the surface of the header-member to create a greater surface for welding of the new tube.

8 Claims, 1 Drawing Figure

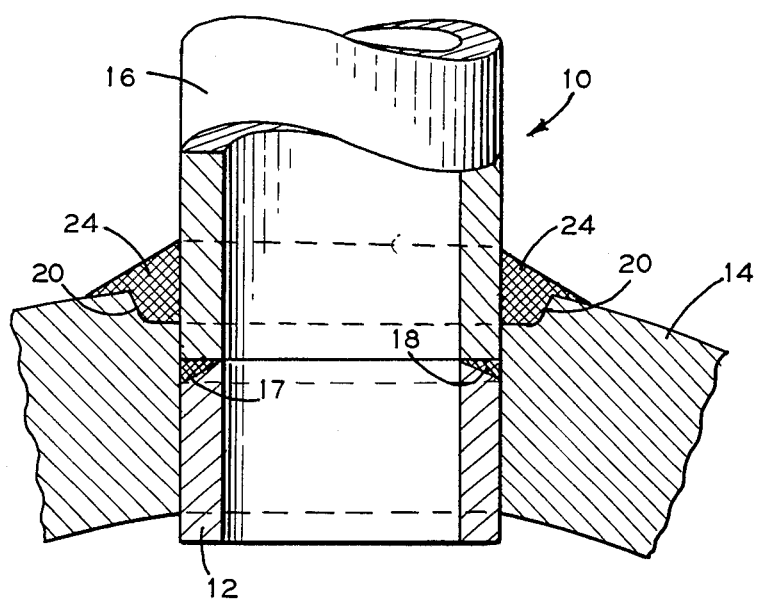

METHOD FOR REPLACING TUBES IN A HEADER OR DRUM

BACKGROUND OF THE INVENTION

1. Field of the Invention

This invention relates to a method for repairing a tube in a header or drum by replacing an old tube with a new tube without entirely removing the old tube.

2. Description of the Prior Art

In many applications in boilers and steam equipment, an array of tubes penetrates some kind of sealing plate, such as a tube sheet in a steam generator, or a drum or header in other applications. Particularly in drums and headers, these tubes may be subject to chemical and thermal corrosion and other degradation and may need to be replaced. In the prior art, such tubes were generally removed from the header or drum (generically a header-member) and wholly replaced with a new tube, which had to be expanded into the header-member to form a seal. Old tubes are typically removed from the header-member by cutting two opposed lengthwise slits through the portion of the tube that penetrates the header-member and then squeezing the tube pieces together so that the tube can be extracted from the header-member. Typically the slits are cut with a cutting torch, which generally results in damage to the hole in the header-member. Both these problems make tube replacement awkward and extremely time consuming and expensive.

Accordingly, there is a clear need for an improved method of repair of defective tubes in header-members that is less costly and significantly reduces the possibility of damaging the header-member.

SUMMARY OF THE INVENTION

Therefore, it is an object of the present invention to provide a method for replacing defective tubes in a header-member that significantly reduces the likelihood of damaging the header-member.

It is a further object of the present invention to provide a method for replacing tubes in a header-member that does not require replacing the entire old tube.

It is a further object of the present invention to provide a method for replacing tubes in a header-member without replacing the entire old tube, that provides a firm, strong connection between the new tube and the header-member, and that secures the old tube to the header-member.

In accordance with these and other objects of the invention, the present invention meets these needs. The various features of novelty that characterize the invention are pointed out with particularity in the claims annexed to and comprising part of the specification. The accompanying drawing and detailed description below thoroughly illustrate and describe a preferred embodiment of the invention and the best mode known to the inventors.

BRIEF DESCRIPTION OF THE DRAWING

The sole FIGURE is a sectional elevation of a field welded tube connection according to the present invention.

DETAILED DESCRIPTION OF THE PREFERRED EMBODIMENT

Referring to the sole FIGURE, there is shown a field welded tube connection 10 according to the present invention wherein old tube 12 embedded in header-member 14, which may be a header, drum or the like and typically is sealed in header-member 14, has been cut flush with the original top surface of header-member 14 and subsequently has been machined down into header-member 14 without enlarging the original hole old tube 12 was seated in, to provide a seat for new tube 16, according to known techniques.

Bevel 17 is formed on the now recessed end of old tube 12. Bevel 17 is then filled by weld bead 18, which secures old tube 12 to header-member 14. Weld bead 18 secures old tube 12 in header-member 14, to prevent old tube 12 from falling out of header-member 14 or otherwise causing difficulties in the future. Naturally, beveling old tube 12 is not strictly required, since weld bead 18 can be laid on a flush tube end; but bevel 17 increases the surface area of old tube 12 that can be welded and helps prevent the welder from closing a portion of the end of old tube 12 during welding. Bevel 17 may be in a range of from about 15° to about 50° of arc, with a bevel of about 30° being preferred.

An area of header-member surrounding the hole in header-member 14 is recessed to form countersink 20 by machining. New tube 16 is then inserted into the seat created thereby for it and held in the proper attitude while weld bead 24 is laid down to secure new tube 16 to header-member 14. Weld bead 24 fills countersink 20 and, in a preferred embodiment, tapers upwardly in conical fashion to increase the surface area of header-member 14 and new tube 16 that are welded.

When weld bead 24 cools, shrinkage tends to pull new tube 16 farther into header-member 14. To accommodate this shrinkage motion, it may be desirable to leave a gap on the order of from about 3/32 inch to about ¼ inch between the ends of new tube 16 and old tube 12 when laying down weld bead 24 with distance of about 1/16 inch being preferred. In actual practice, however, it has been found that old tube 12 and new tube 16 may be abutting during welding of weld bead 24 without creating difficulty.

Old tube 12, that remains in header-member 14, serves no useful purpose and its structural integrity is not important. The method of the present invention may be used with a wide variety of members. For example, it has been successfully used with tubes from less than 1 inch to more than 5 inches in diameter and has been employed on 8 inch pipes and 6 foot drums, both including many tubes. Header-member 14 may have a wall thickness from approximately 0.500 inch to 8 inches or more thick.

While the invention has been described with particular reference to a preferred embodiment, it is apparent that changes may occur to those skilled in the art and therefore the scope of the invention should be measured from the claims that follow rather than from the preferred embodiment described above.

We claim:

1. A method of repairing an old tube that penetrates beyond the wall thickness of a wall of a header-member comprising:
    (a) severing the old tube to form a cut end proximate the header-member;
    (b) machining the cut end of the old tube to form a recess and recessed tube end within the wall thickness of the header-member;
    (c) welding the recessed old tube end within the wall thickness to the header-member;

(d) inserting an end of a new tube into the recess within the header-member proximate the recessed old tube end; and (e) welding the new tube to the header-member.

2. A method according to claim 1 wherein step (b) further includes forming a bevel on the recessed old tube end.

3. A method according to claim 2 wherein step (c) comprises laying a weld bead about said bevel such that said bevel is filled by said weld bead.

4. A method according to claim 1 further comprising the step of forming a countersink in the header-member for providing a greater area of exposed new tube for welding to the header-member and wherein the step of welding the new tube to the header-member comprises forming a bead of weld in the countersink circumferentially connecting the new tube to the header-member.

5. A method according to claim 2 wherein the angle of the bevel is in a range from about 15° to about 50° of arc.

6. A method according to claim 1 wherein step (e) further comprises forming a weld bead that is approximately conically shaped to increase the surface area of the new tube that is welded to the header-member.

7. A method according to claim 1 wherein step (e) further comprises abutting said old tube and said new tube and holding said new tube in a predetermined attitude during the welding of step (e).

8. A method according to claim 1 wherein step (e) further comprises maintaining a distance of from about 3/32 inch to about ¼ inch between said old tube end and said new tube end during welding of step (e) to allow for the pull down effect from cooling shrinkage of the weld bead created in step (e).

* * * * *